(12) United States Patent
Li et al.

(10) Patent No.: US 11,842,472 B2
(45) Date of Patent: Dec. 12, 2023

(54) OBJECT DEFECT CORRECTION

(71) Applicant: International Business Machines Corporation, Armonk, NY (US)

(72) Inventors: Jinfeng Li, Beijing (CN); Guo Qiang Hu, Shanghai (CN); Jian Xu, Shanghai (CN); Fan Li, Shanghai (CN); JingChang Huang, Shanghai (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 16/835,785

(22) Filed: Mar. 31, 2020

(65) Prior Publication Data
US 2021/0304389 A1 Sep. 30, 2021

(51) Int. Cl.
*G06T 7/00* (2017.01)
*G06N 20/00* (2019.01)
*G06F 18/25* (2023.01)
*G06F 18/214* (2023.01)
*G06F 18/2413* (2023.01)
*G06V 10/764* (2022.01)

(52) U.S. Cl.
CPC ........ *G06T 7/0004* (2013.01); *G06F 18/2148* (2023.01); *G06F 18/2413* (2023.01);
(Continued)

(58) Field of Classification Search
CPC ......... G06T 7/0004; G06T 2207/20081; G06T 2207/20212; G06T 2207/30121;
(Continued)

(56) References Cited

U.S. PATENT DOCUMENTS 7,283,659 B1 10/2007 Bakker et al.
8,607,169 B2 12/2013 Leu
(Continued)

FOREIGN PATENT DOCUMENTS

CN 101853522 A 10/2010

OTHER PUBLICATIONS

Saqlain, Muhammad, Bilguun Jargalsaikhan, and Jong Yun Lee. "A voting ensemble classifier for wafer map defect patterns identification in semiconductor manufacturing." IEEE Transactions on Semiconductor Manufacturing 32.2 (2019): 171-182. (Year: 2019).*
(Continued)

*Primary Examiner* — Amandeep Saini
*Assistant Examiner* — Denise G Alfonso
(74) *Attorney, Agent, or Firm* — Aaron N. Pontikos

(57) ABSTRACT

According to embodiments of the present invention, a method, a device and a computer program product for image processing is provided. A computing device obtains an image of a first object, the image presenting a defect of the first object. A computing device obtains defect distribution information indicating respective frequencies of a plurality of predetermined categories of defects presented at corresponding locations in a plurality of training images, the plurality of training images presenting second objects and being used for training a defect classifier. A computing device determines a target category of the defect of the first object by applying the image and the defect distribution information to the defect classifier. A computing device generates one or more correction notifications.

14 Claims, 9 Drawing Sheets

(52) U.S. Cl.
CPC ............. *G06F 18/25* (2023.01); *G06N 20/00* (2019.01); *G06V 10/764* (2022.01); *G06T 2207/20081* (2013.01); *G06T 2207/20212* (2013.01); *G06T 2207/30121* (2013.01); *G06T 2207/30141* (2013.01); *G06T 2207/30148* (2013.01)

(58) Field of Classification Search
CPC . G06T 2207/30141; G06T 2207/30148; G06T 7/0002; G06K 9/6257; G06K 9/6288; G06K 9/6268; G06N 20/00; G06V 2201/06
See application file for complete search history.

(56) References Cited

U.S. PATENT DOCUMENTS

| | | |
|---|---|---|
| 2011/0182495 A1 | 7/2011 | Sun et al. |
| 2013/0294680 A1 | 11/2013 | Harada et al. |
| 2015/0019014 A1 | 1/2015 | Kim |
| 2018/0293806 A1* | 10/2018 | Zhang .................... G07C 5/008 |
| 2019/0147127 A1 | 5/2019 | Su et al. |

OTHER PUBLICATIONS

Babicki, Sasha, et al. "Heatmapper: web-enabled heat mapping for all." Nucleic acids research 44.W1 (2016): W147-W153. (Year: 2016).*

Tran, Hai, et al. "Burn image classification using one-class support vector machine." ICCASA. Springer, Cham, 2015. (Year: 2015).*

Duchowski, Andrew T., et al. "Aggregate gaze visualization with real-time heatmaps." Proceedings of the symposium on eye tracking research and applications. 2012. (Year: 2012).*

Zhou, Fei, et al. "A generic automated surface defect detection based on a bilinear model." Applied Sciences 9.15 (2019): 3159. (Year: 2019).*

Mell et al., "The NIST Definition of Cloud Computing", National Institute of Standards and Technology, U.S. Department of Commerce, Special Publication 800-145, 7 pages.

\* cited by examiner

500

OBJECT DEFECT CORRECTION

BACKGROUND

The present invention relates to image processing, and more specifically, to a method, a device and a computer program product for categorizing a defect of an object presented in an image.

Generally, there is a high demand on automated and accurate defect categorization in manufactory industry. Automated visual inspection technologies have been developed for the defect categorization and can be applied in areas such as inspection of smartphone part assembling, component-level defect inspection on Printed Circuit Board (PCB), Liquid Crystal Display (LCD) panel defect detection.

SUMMARY

Embodiments of the present invention provide a method, system, and program product for categorizing a defect of an object presented in an image.

A first embodiment encompasses a method for categorizing a defect of an object presented in an image. One or more processors obtain an image of a first object, the image presenting a defect of the first object. One or more processors obtain defect distribution information indicating respective frequencies of a plurality of predetermined categories of defects presented at corresponding locations in a plurality of training images, the plurality of training images presenting second objects and being used for training a defect classifier. One or more processors determine a target category of the defect of the first object by applying the image and the defect distribution information to the defect classifier.

A second embodiment encompasses a computer program product for categorizing a defect of an object presented in an image. The computer program product includes one or more computer-readable storage media and program instructions stored on the one or more computer-readable storage media. The program instructions include program instructions to obtain an image of a first object, the image presenting a defect of the first object. The program instructions include program instructions to obtain defect distribution information indicating respective frequencies of a plurality of predetermined categories of defects presented at corresponding locations in a plurality of training images, the plurality of training images presenting second objects and being used for training a defect classifier. The program instructions include program instructions to determine a target category of the defect of the first object by applying the image and the defect distribution information to the defect classifier.

A third embodiment encompasses a computer system for categorizing a defect of an object presented in an image. The computer system includes one or more computer processors, one or more computer-readable storage medium, and program instructions stored on the computer-readable storage medium for execution by at least one of the one or more processors. The computer program includes one or more computer-readable storage media and program instructions stored on the one or more computer-readable storage media. The program instructions include program instructions to obtain an image of a first object, the image presenting a defect of the first object. The program instructions include program instructions to obtain defect distribution information indicating respective frequencies of a plurality of predetermined categories of defects presented at corresponding locations in a plurality of training images, the plurality of training images presenting second objects and being used for training a defect classifier. The program instructions include program instructions to determine a target category of the defect of the first object by applying the image and the defect distribution information to the defect classifier.

DETAILED DESCRIPTION

Figure 1:
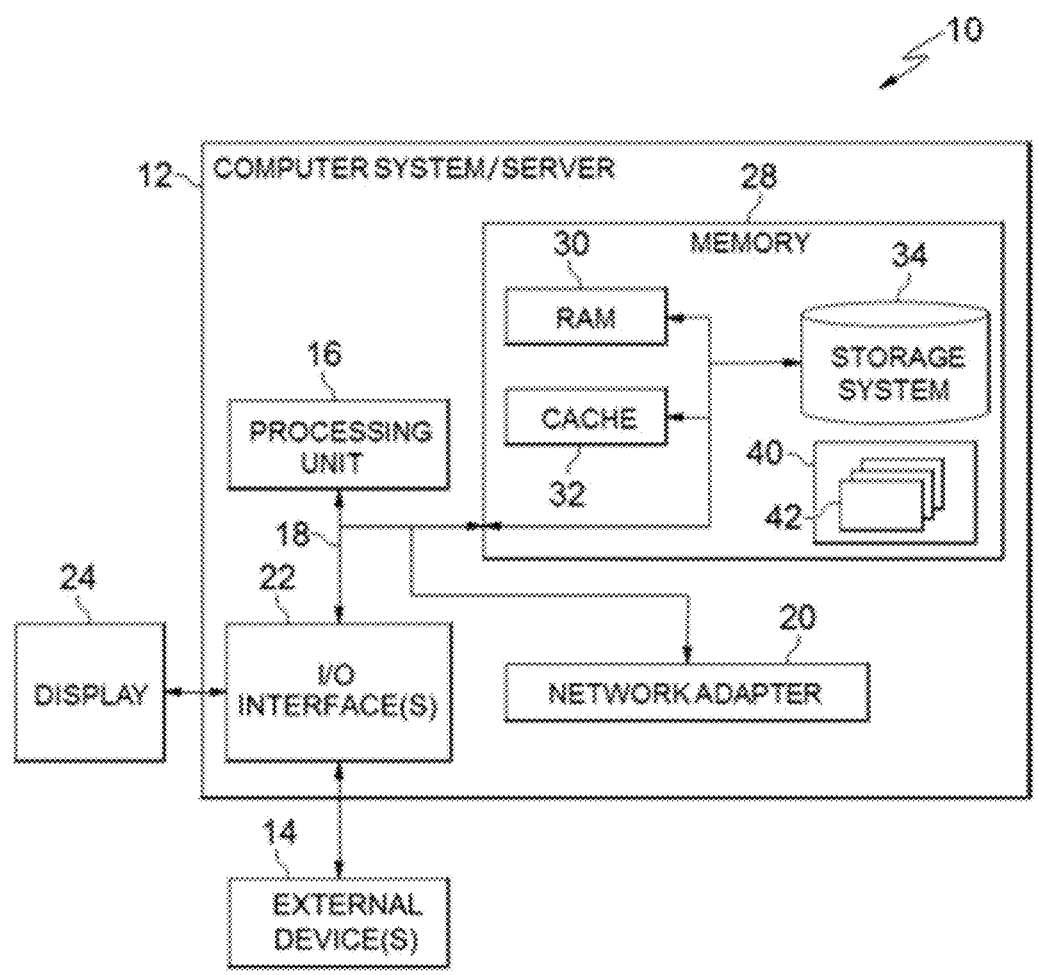
FIG. 1 depicts a block diagram of components of one or more computing devices within the computing environment depicted in FIG. 1 in accordance with an exemplary embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinafter.

In cloud computing node 10 there is a computer system/server 12 or a portable electronic device such as a communication device, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 is utilized in a distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. In one example and embodiment, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and generally referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 in one example and embodiment, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
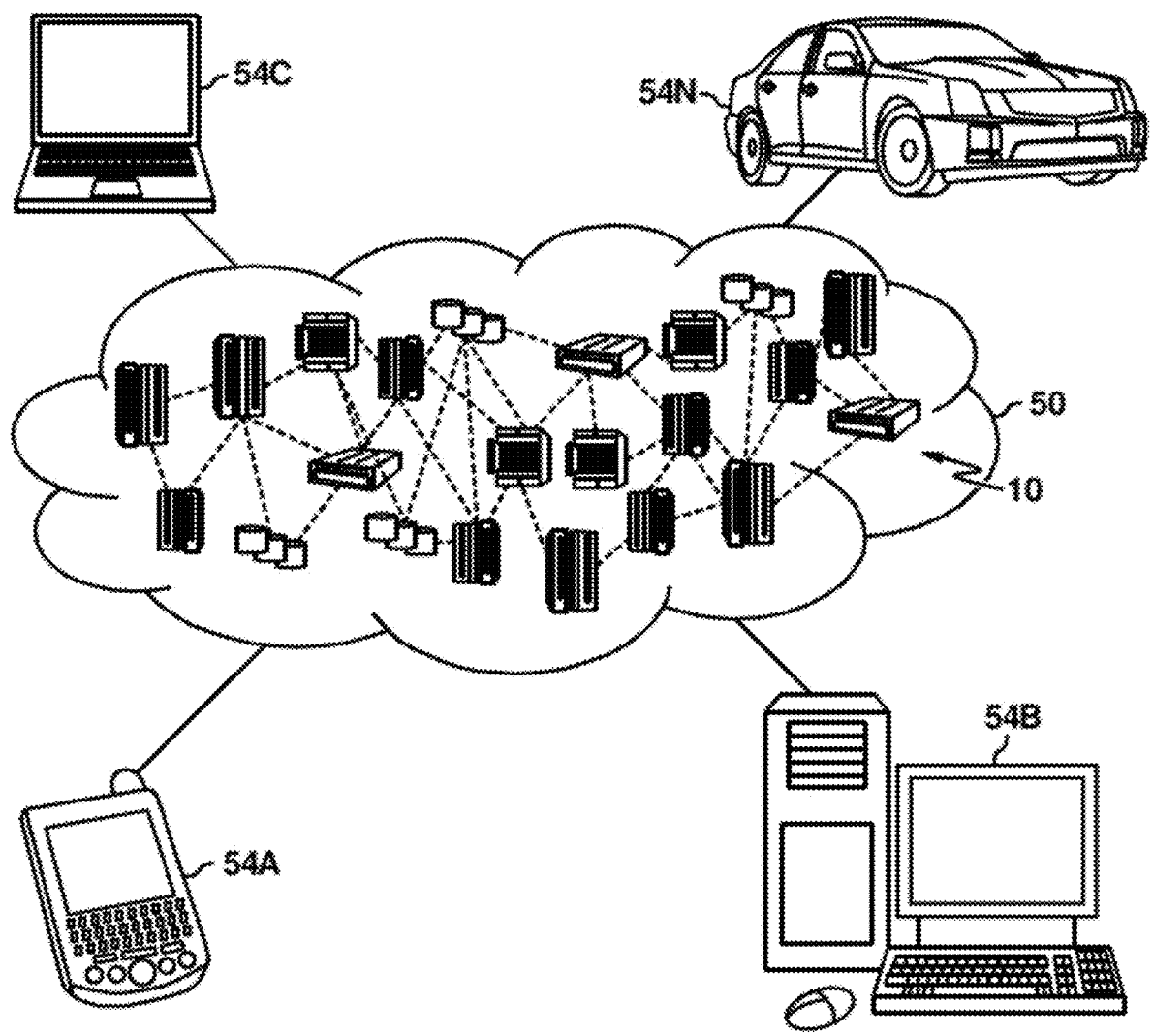
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate with one another. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
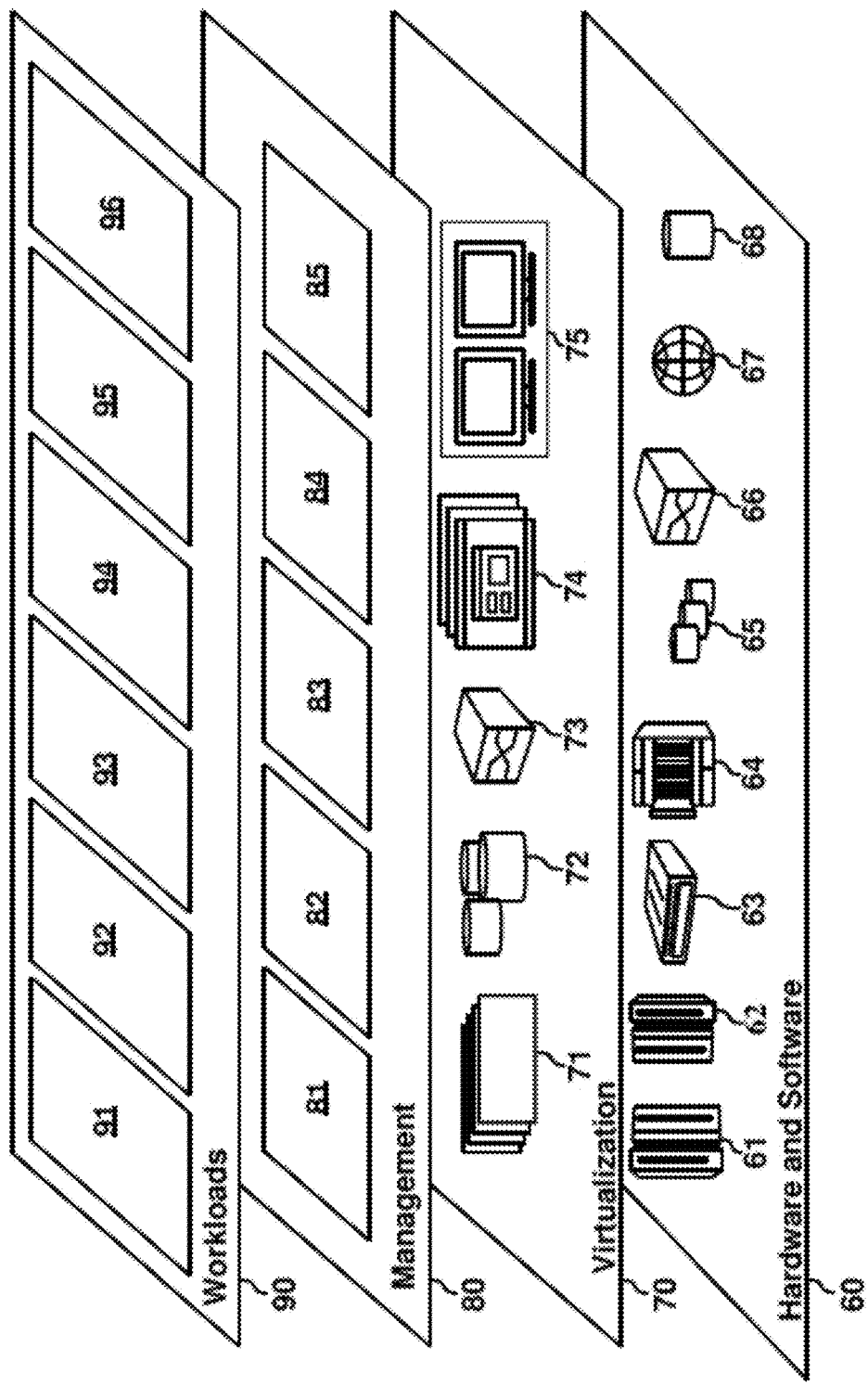
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and defect categorizing 96.

Accurate defect categorization is of great significance for the manufactory industry. A category of a defect in an object manufactured depends on the reason that causes the defect in the object. For example, for a LCD panel, the defect can be categorized into a dead pixel(s), a scratch(s), a bubble(s) or the like, and for a PCB panel, the defect can be categorized into poor soldering, missing component or the like.

Traditionally, the defect categorization is to calculate a confidence or probability that the defect belongs to a certain category. However, if the confidence that the defect belongs to a category is approximate to the confidence that the defect belongs to another category, it is hard to tell which of the categories the defect actually belongs to. In one embodiment and example, if the confidence that the defect belongs to the category of a dead pixel is 51%, and the confidence that the defect belongs to the category of a scratch is 49%, then simply categorizing the defect to belong to the category of the dead pixel might not be correct in all cases.

In various embodiments of the present disclosure provide an improved solution for defect categorization, and in some embodiments may include providing of a suggested course of action that is predicted to correct, at least partially, the defect. In various embodiments, computer system/server 12 generates a correction notification and communicates the correction plan to a user of computer system/server 12 with program instructions instructing the user on how to diminish or deplete the defects identified by object classifier 610. Generally speaking, according to embodiments of the present disclosure, the solution obtains an image of a first object and defect distribution information. The image presents a defect of the first object. The defect distribution information indicates respective frequencies of a plurality of predetermined categories of defects presented at corresponding locations in a plurality of training images. The plurality of training images presents second objects and are used for training a defect classifier. As such, a target category of the defect of the first object can be determined by applying the image and the defect distribution information to the defect classifier.

In this way, by taking into account the predetermined defect distribution information, the defect of the object can be categorized more accurately and efficiently. This solves the dilemma resulting from the approximate confidence. In the above example scenario, the confidence that the defect belongs to the category of a dead pixel is 51%, and the confidence that the defect belongs to the category of a scratch is 49%. If the defect distribution information indicates that the frequency of a scratch presented at the location where the defect is presented is high, but the frequency of a dead pixel presented at this location is low, then it is more reasonable to categorize the defect to belong to the category of the scratch.

Figure 4:
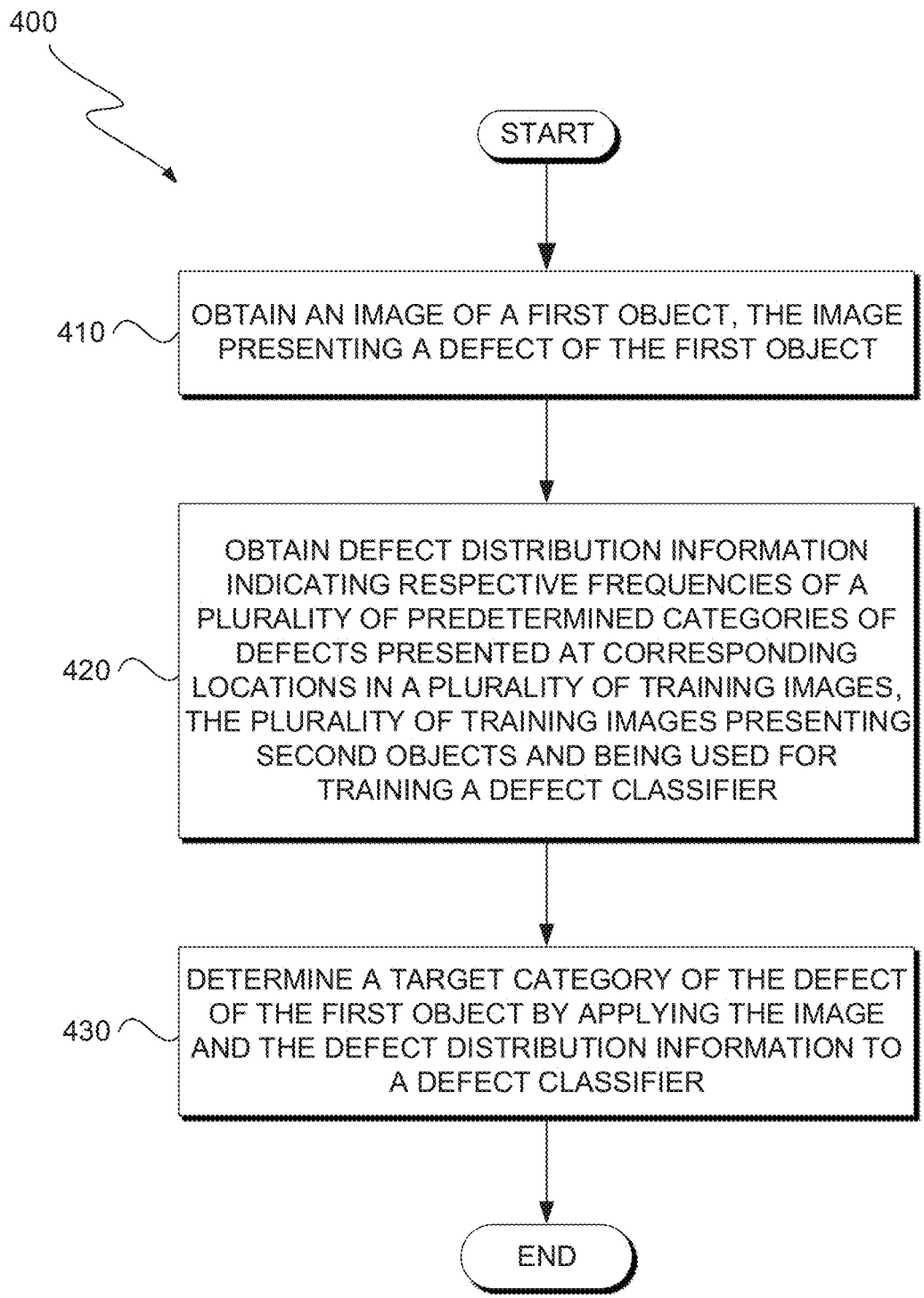
FIG. 4 illustrates operational processes of a system for categorizing a defect of an object according to an embodiment of the present invention.

Now some example embodiments will be described with reference to FIGS. 4-9. FIG. 4 shows a flowchart of an example method 400 for categorizing a defect of an object according to an embodiment of the present invention. The method 400 may be implemented by the computer system/server 12, or other suitable computer/computing systems.

In operation 410, the computer system/server 12 obtains an image of a first object. The image presents a defect of the first object. In one embodiment and example, the first object can be a product in the manufacture industry, such as an LCD panel, a PCB panel, a Light Emitting Diode (LED) panel, a Complementary Metal Oxide Semiconductor (CMOS) circuit or any other product that is required for defect detection. In some embodiments, due to an issue or problem occurred during the manufacturing process, the first object can be defective. In some embodiments, defects of the first object can be visually inspected and thus can be presented in the image of the first object. In various embodiments, defects included in the first object may include one or a combination of categories of possible defects including, but are not limited to, a dead pixel, a scratch, a bubble or the like in the LCD panel, or poor soldering, a missing component or the like in the PCB panel. One having ordinary skill in the art would understand that there are many categories of possible defects that may be recognized in various embodiments. The present invention recognizes that the object and the defects listed here are provided for the purpose of example only and any other objects that are required for defect detection and any other defects are also applicable for the embodiments of the present invention. It should be appreciated that the examples presented or non-limiting and non-exhaustive. One having ordinary skill in the art would understand that these examples are scenario specific, and the characteristics of each individual scenario may occur in different frequencies or at corresponding locations in the training images.

Figure 5:
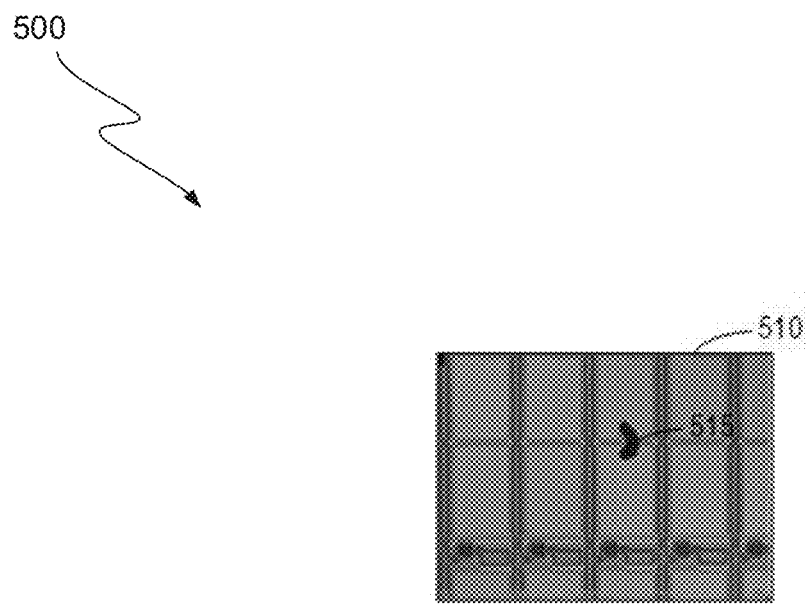
FIG. 5 shows a schematic diagram of an example image of an object according to an embodiment of the present invention.

FIG. 5 shows a schematic diagram, 500, of an example image 510 of the first object according to an embodiment of the present invention. In various embodiments, the image 520 is an image of a portion of a display panel. It can be seen from the image 510 that a defect 515 is presented at a certain location of the display panel. It would be appreciated that the properties, such as location, shape, size, and the like, of the defect 515 shown in FIG. 5 are intended to be illustrative only and embodiments of the invention are not limited thereto.

In various embodiments, it is important to identify a category of the defect of the first object through analyzing the image. In various embodiments of the present invention, defect categorization, as recognized in operation 420, the computer system/server 12 obtains defect distribution information. The defect distribution information is utilized to facilitate the defect categorization to be performed on the image of the first object. The defect distribution information indicates respective frequencies of a plurality of predetermined categories of defects presented at corresponding locations in a plurality of training images. For each category, the defect distribution information can indicate frequencies of defects of this category presented at corresponding locations in the training images.

In various embodiments, the plurality of training images present second objects having respective defects. As compared with the image 510 of the first object, the category of the defect presented in each of the training images of the second objects has already been known. With the category known for each of the training images, the training images can be used for training a defect classifier. In various embodiments, the defect classifier determines a category of a defect of an object by processing at least an image of the object. In various embodiments, the defect classifier includes one or a combination of a binary classifier, a multi-class classifier or any other suitable classifier, and can be implemented using various approaches including, but is not limited to, Linear Regression, Ordinary Least Squares Regression, Decision Tree, Naive Bayesian Classification, Artificial Neural Networks, k-Nearest Neighbors, Support Vector Machine or any suitable approach that can be used for categorization. The training of the defect classifier will be discussed below in greater detail with reference to FIG. 8.

The defect distribution information can imply two key factors: the categories of the defects and location of the defects presented in the training images. More specifically, the defect distribution information can be generated from these two factors. In some embodiments, in generating the defect distribution information, the computer system/server 12 may obtain label information for the training images, which indicates the category of the defect presented in each of the training images. In addition, the computer system/server 12 may identify a plurality of regions of the training images where the defects are presented. After obtaining the two key factors, the computer system/server 12 may determine the defect distribution information based on the label information and the plurality of regions. In this case, the distribution of the defects of each category indicated by the label information can be determined.

In operation 430, the computer system/server 12 determines a target category of the defect of the first object by applying the image and the defect distribution information to the defect classifier. In example embodiments of the present invention, computer system/server 12 requires (i) the image and (ii) the defect distribution information as provided by the inputs to the defect classifier are required for defect categorization. The defect distribution information, which is derived from the training images for training the defect classifier, enables the defect classifier to provide a more accurate categorization result for the image.

Figure 6:
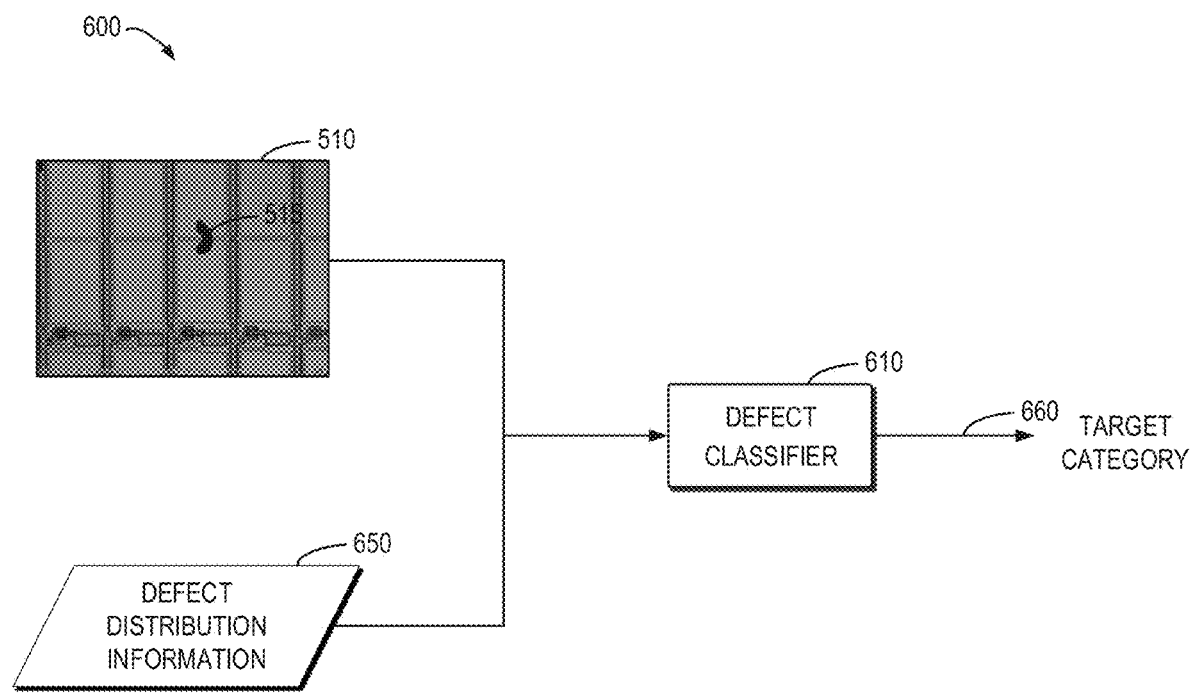
FIG. 6 shows a schematic diagram of an example of using a defect classifier to determine a category of an object according to an embodiment of the present invention.

FIG. 6 shows a schematic diagram of an example process 600 of using a defect classifier 610 to determine a target category of the first object according to an embodiment of the present invention. As shown in FIG. 6, the image 510 is used as an example of the image of the first object. The computer system/server 12 may apply the image 510 of the first object and the defect distribution information 650 as inputs to the defect classifier 610.

The defect classifier 610 is also able to identify a location where the defect 515 is presented in the image 510. The defect classifier 610 can have knowledge of the distribution of the defects of each category in the training images from the defect distribution information 650. With the knowledge of the defect distribution per category and the location of the defect 515, the target category 660 of the defect 515 can thus be determined.

The use of the defect distribution information is based on the observations that the defects of the same category are presented at substantially the same location of objects in most cases, especially when the objects are all produced in a same manufacturing process. In this case, if the defect 515 is presented in a location of the image 510 where defects of a certain category are frequently presented, the defect 515 may probably belong to that category. As such, the defect classifier 610 can output the determined target category 660 of the defect 515.

In some embodiments, the defect distribution information may be indicated by a plurality of heat maps corresponding to the plurality of predetermined categories, respectively. In various embodiments, each heat map may correspond to a predetermined category. A heat map can indicate frequencies of a category of defects presented at corresponding locations in the training images. The locations with high frequencies are represented as a hot area in the heat map. As such, the heat map can clearly indicate the area where defects of the same category are presented in the training image by highlighting the hot area.

Figure 7:
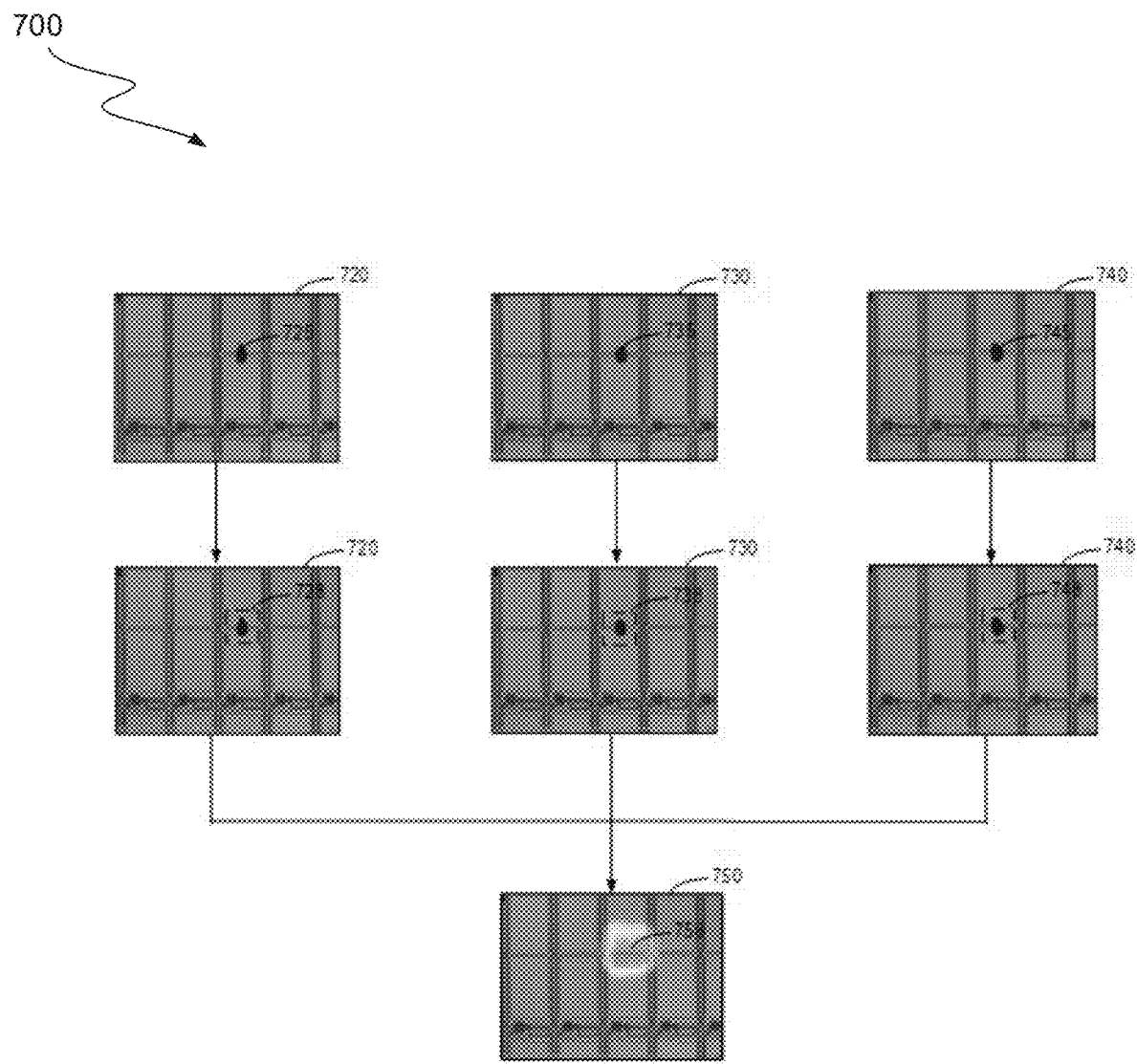
FIG. 7 shows a schematic diagram of example heat map generation process according to an embodiment of the present invention.

In various embodiments, FIG. 7 shows a schematic diagram of an example heat map generation process 700 according to an embodiment of the present invention. As shown in FIG. 7, a training image 720 presents a second object with a defect 725, a training image 730 presents a second object with a defect 735, and a training image 740 presents a second object with a defect 745. It should be understood in advance that the properties, such as location, shape, size, and the like, of the defects shown in FIG. 7 are intended to be illustrative purposes only and embodiments of the invention are not limited thereto.

In one embodiment and example, the second objects shown in the images 720-740 may be produced in the same process, and the defects 725-745 of the second objects belong to the same category including, but not limited to, a scratch. It should be understood that the images 720-740 and their defects 725-745 are shown as an example for describing the generation process of the heat map of a certain category (e.g., a scratch). Heat maps of other category (for example, the dead pixel, bubble or the like) may follow a similar generation process.

These training images 720-750 can be used to generate a heat map 750, and thus the defect distribution information 650. It should be understood that the generation of the defect distribution information 650 can be performed by the computer system/server 12. Alternatively, the generation can be performed by any other suitable entities, such as a dedicated computer, a distributed computing system or the like, and the generated defect distribution information 650 can be provided to the computer system/server 12. In one embodiment and example, the generation is described as being implemented by the computer system/server 12. The computer system/server 12 identifies a plurality of regions 728-748 of the training images 720-740 where the defects 725-745 are presented. In some embodiments, the regions 728-748 can be represented by coordinates of the regions 728-748 in the training images 720-740. In various embodiments, a region can be represented by the coordinates of the upper left corner and the coordinates of the bottom right corner of the region in the training image.

The computer system/server 12 may generate a heat map 750 based on the regions 728-748 of the training images 720-740 where the defects 725-745 are presented. In some embodiments, the training images 720-740 may be scaled into a same size if they are originally of different sizes. In some embodiments, a defect distribution matrix can be used in the generation of the heat map 750. The defect distribution matrix includes a plurality of elements. Each element corresponds to a location in the training image, for example, a pixel in the training image. In addition, since a location in the training image will correspond to a location in the heat map 750, each element also corresponds to a location in the heat map 750. That is to say, the training image, the heat map 750, and the defect distribution matrix have location correspondence. The value of the element indicates the frequency that defects of a certain category presented at the corresponding location.

At the initial stage, the computer system/server 12 can set the defect distribution matrix to 0. When a defect is found to be presented in a location, the computer system/server 12 can increment the value of the element corresponding to that location. In this case, the value of the element increments with the presence of the defect in the corresponding location, and thus the value can represent the number of times or frequency that defects of a certain category are presented at the location.

In various embodiments, for the training images 720-740, the computer system/server 12 can increment the values of the elements corresponding to the locations within the regions 728-748, while the remaining values of the elements corresponding to the locations outside the regions 728-748 are unchanged. In some embodiments, the frequencies of the defects 725-745 of the scratch category are presented at corresponding locations in the training images 720-740 can be determined.

In some embodiments, the computer system/server 12 can normalize the defect distribution matrix. In one embodiment and example, the values of all the elements in the defect distribution matrix may be divided by the maximum element value. In this case, the values of the elements are ranged from 0 to 1, which facilitate the conversion of the defect distribution matrix into an intermediate map for the heat map described below.

In some embodiments, the computer system/server 12 can convert the normalized defect distribution matrix into an image, referred to as an intermediate map. Since the pixels of the intermediate map are converted from the elements of the defect distribution matrix, the pixel value can represent the frequency that defects of a certain category presented at a corresponding location, just like the value of the element. However, since the intermediate map is in the image format, the locations with high frequencies can be highlighted and represented as a hot area 758.

In various embodiments, in order to clearly show where the hot area 758 resides in the training image, the intermediate map may be displayed with a background of the training image. In this case, the computer system/server 12 may generate a background image based on a training image, for example, one of training images 720-740. In some embodiments, the computer system/server 12 adjusts the intermediate map based on a factor indicating a contrast or transparency of the intermediate map against the background image. Finally, the computer system/server 12 generates the heat map 750 by combining the background image with the adjusted intermediate map. In various embodiments, the adjusted intermediate map may be overlapped on the background image to generate the heat map 750.

The above text described the generation process of a heat map for one category. Heat maps of all the predetermined categories in the training images can be generated in this way. It is assumed that all the training images present a total of N categories of defects, in which N represent an integer greater than 1. In this case, a total of N heat maps corresponding to the N categories of defects can be determined, and then can be applied to the defect classifier 610 with the image 510, to determine the category of the defect 515 in the image 510.

Using the defect classifier 610 to determine the category of object 515 has been described above in detail. In order to facilitate the understanding of the defect classifier 610, the training of the defect classifier 610 will now be described. In some embodiments, before categorizing the defect in the image 510 using the defect classifier 610, the computer system/server 12 may determine the defect classifier 610 in advance. The defect classifier 610 can be determined based on the training images and the defect distribution information, such that the trained defect classifier 610 can accurately predict the category of the defect in consideration of the statistical defect distribution.

Figure 8:
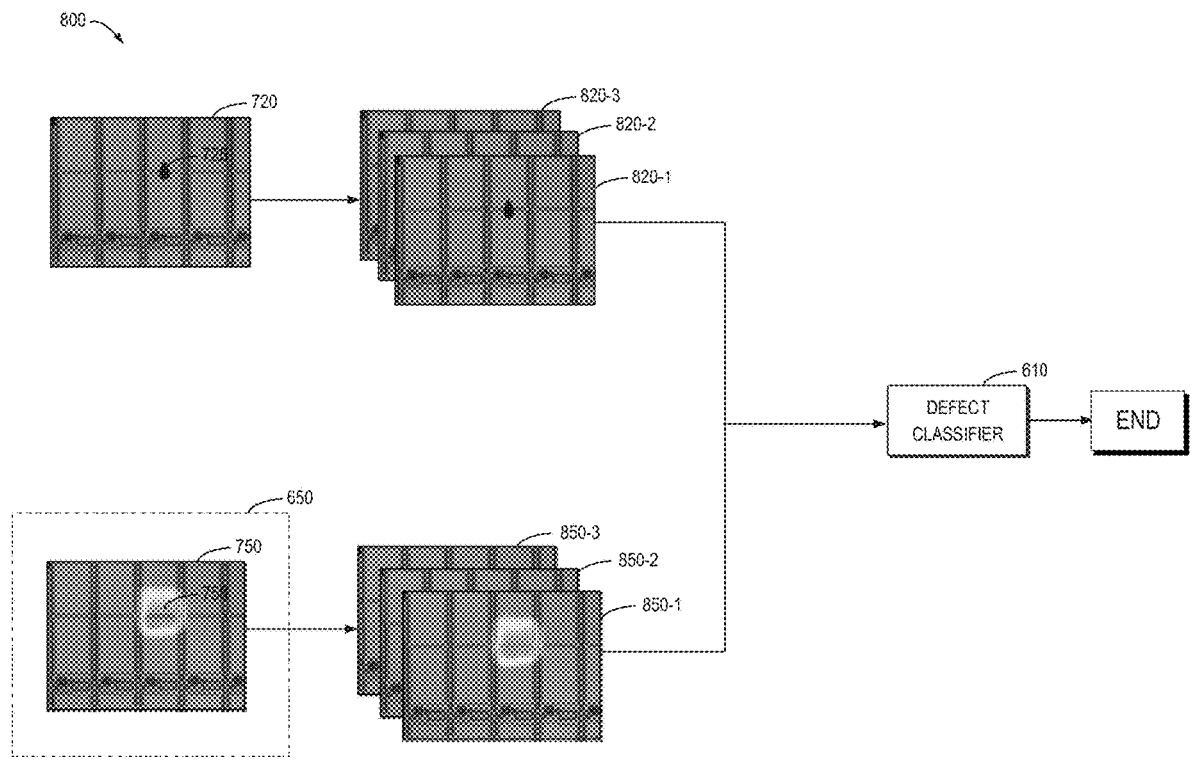
FIG. 8 shows a schematic diagram of an example of training the defect classifier of FIG. 6 according to an embodiment of the present invention.

FIG. 8 shows a schematic diagram of an example process 800 of training the defect classifier 610 of FIG. 6, according to an embodiment of the present invention. It should be appreciated that the process 800 can be performed by the computer system/server 12. Alternatively, the process 800 can be performed by any other suitable entities, such as a dedicated computer, a distributed computing system or the like, and the well-trained defect classifier 610 can be deployed into or used by the computer system/server 12. For the purpose of illustrative simplicity, the process 800 is described as being implemented by the computer system/server 12.

In various embodiments, the computer system/server 12 applies all the training images (the training image 720 is shown only) and the defect distribution information 650 to the defect classifier 610. It should be appreciated that, although FIG. 8 only shows the training image 720, all the training images, including but not limited to, the training images 730-740 and other training images presenting the defects of other categories, are also used to train the defect classifier 610. In addition, the heat map 750 generated from the training images 720-740 is shown for the purpose of illustration. In various embodiments, heat maps for all of the categories of the defects are used associated with the training of the defect classifier 610.

The parameters of the defect classifier 610 can be tuned during the training process, such that the predicted category of the defect presented in the training image approaches the actual category of the defect which is already known and indicated by the label information. In various embodiments, it is assumed that the category of the defect 725 in the training image 720 is the scratch. In training the defect classifier 610 with the training image 720, the parameters of the defect classifier 610 is tuned, such that the predicted category of the defect 725 approaches the actual category of the scratch.

In various embodiments, computer system/server 12 receives the categories of the defects identified by defect classifier 610. Computer system/server 12 analyzes the categories of defects identified and determines a set of corrective actions to correct the defect. In various embodiments, computer system/server 12 generates a correction notification based on, but is not limited to, the data obtained by defect classifier 610 associated with the identified defects and the related categories. In some embodiments, computer system/server 12 includes machine learning and learns which actions are most likely to resolve the defects. In various embodiments, computer system/server 12 analyzes the data associated with the identified defects and the related categories and learns over a threshold period of time which correction notifications resolve the defects. In some embodiments, computer system/server 12 identifies that over a threshold period of time one or more correction notifications resolve the defects in various categories. Computer system/server 12 updates the one or more correction notifications to include the correction notifications that resolve the defects.

In various embodiments, computer system/server 12 analyzes the data associated with the defects and related categories and identifies one or more defects associated with a singular object. In some embodiments, computer system/server 12 determines that the one or more defects is associated with an issue related to the products used for manufacturing. In one embodiment and example, computer system/server 12 identifies a threshold level of bubbles appear on the surface of the product. Computer system/server 12 determines that there is an issue with the resin or the curing process. In various embodiments, computer system/server 12 generates a product notification with instructions and communicates the product notification to a user of computer system/server 12 and instructs the user of the defects in the products used for manufacturing. Additionally, the product notification includes, but is not limited to, instructions on how to resolve the issue in the products used for manufacturing.

In some embodiments, to improve the accuracy of the categorization, the computer system/server 12 converts the input image of the defect classifier 610 from a multi-color channel image into several single-color channel images, such that the different color channels can be separately considered by the defect classifier 610 for defect categorization. In various embodiments, a training image may be an RGB (Red, Green, Blue) image and thus may be converted into three single-color channel images that includes, one or a combination of, (i) the red channel image, (ii) the green channel image, or (iii) the blue channel image. In some embodiments, for each of the individual training images, the computer system/server 12 generates one or more single-color channel images in a plurality of color channels from the training image. The one or more single-color channel images are referred to as a set of intermediate images.

In various embodiments, the computer system/server 12 generates another set of intermediate images in the plurality of color channels from each of the plurality of heat maps of the defect distribution information 650. As shown in FIG. 8, the set of intermediate images generated from the training image 720 includes the intermediate images 820-1, 850-2, and 820-3, and the other set of intermediate images generated from the heat map 750 includes the intermediate images 850-1, 850-2, and 850-3. Other training images and other heat maps may also be similarly converted to respective intermediate images in the plurality of color channels.

It should be appreciated that the training image 720 and the heat map 750 are shown for purpose of illustration only. In various embodiments, all the heat maps for all of the categories of defects are converted into single-color channel images. In various embodiments, all the training images, include, but are not limited to, the training images 730, 740 or the like, are converted into single-color channel images. For each of the individual training images, the single-color channel images generated from the training images 730, 740, or the like are combined with the single-color channel images generated from all the heat maps. In one embodiment and example, as opposed to applying the original training images and heat maps, these single-color channel intermediate images are applied to the defect classifier 610 for training.

After the training process 800, the trained defect classifier 610 can be deployed into the computer system/server 12 for categorization of the defect 515 of the first object. As discussed above, in some embodiments, the defect classifier 610 may be trained using single-color channel images generated from the original image. In some embodiments, in the categorization of the defect 515, the image 515 and the heat maps of the defect distribution information 650 can also be converted into single-color channel images. The defect categorization using the converted single-color channel images are described with reference to FIG. 9.

Figure 9:
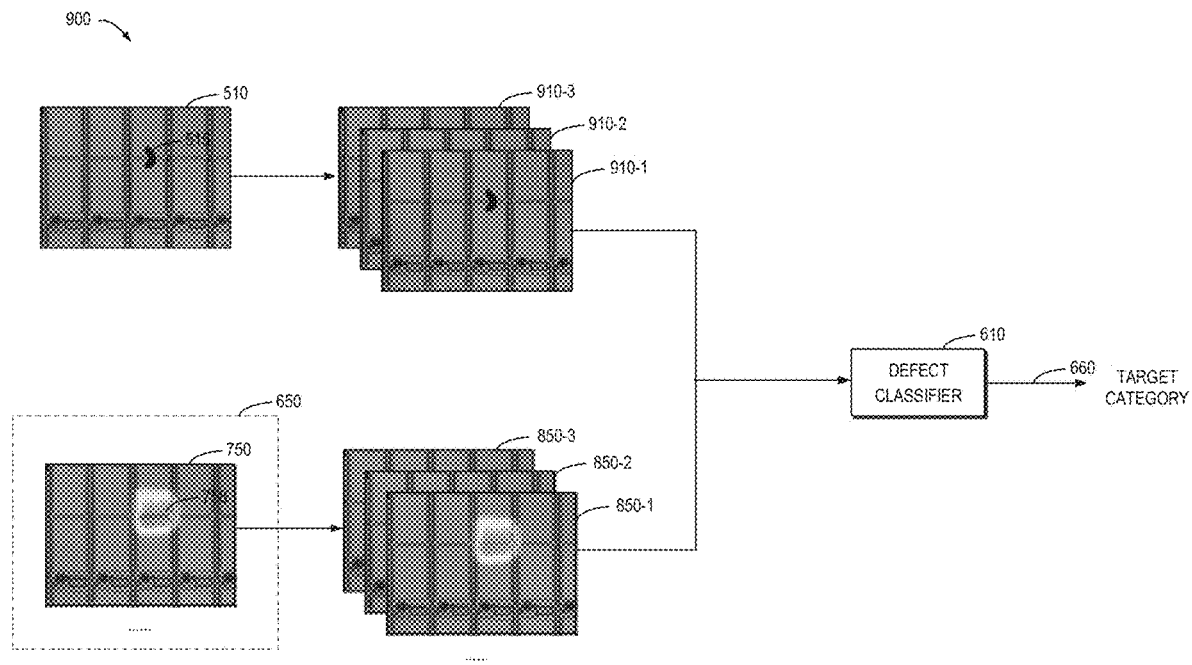
FIG. 9 shows a schematic diagram of another example of using a defect classifier to determine a category of an object according to an embodiment of the present invention.

FIG. 9 shows a schematic diagram of another example process 900 of using a defect classifier to determine a category of an object according to an embodiment of the present invention. As shown, the computer system/server 12 converts the image 515 into a first set of intermediate images 910-1 to 910-3 in a plurality of color channels and converts the heat map 750 into a second set of intermediate images 850-1, 850-2, and 850-3 in a plurality of color channels. It should be appreciated that the heat map 750 are shown for illustrative simplicity. In various embodiments, all of the heat maps for all of the categories of defects are converted into single-color channel images. In various embodiments, the computer system/server 12 combines and applies these single-color channel intermediate images to the defect classifier 610 for categorization. As such, the target category 660 may be identified.

In various embodiments, in addition to the image per se, the defect is categorized based on the additional statistic defect distribution, which improves the accuracy of the defect categorization. In addition, in some embodiments, by converting the multi-channel image into single-channel images, individual color channels can be considered separately, which further improves the accuracy of the defect categorization.

In some embodiments, computer system/server 12 represents machine learning (e.g., cognitive AI). The present invention recognizes that computer system/server 12 is able to learn from the data obtained from defect classifier 610 and determines a corrective course of action to mitigate or deplete the defects in the one or more objects. In various embodiments, computer system/server 12 analyzes the data associated with the identified defects over a threshold period of time. In various embodiments, computer system/server 12 learns over a threshold period of time the categories that the defects most frequently appear and determines the cause of the one or more defects (e.g., low quality products of manufacturing, the manufacturing process is causing the defects, etc.). In various embodiments, computer system/server 12 generates one or more correction notifications based on, but is not limited to, (i) the one or more identified defects and (ii) the cause of the one or more defects.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   obtaining, by one or more processors, an image of a first object, the image presenting a defect of the first object;
   obtaining, by the one or more processors, defect distribution information indicating respective frequencies of a plurality of predetermined categories of defects presented at corresponding locations in a plurality of training images, wherein the plurality of training images are multi-color channel images presenting second objects used for training a defect classifier;
   converting, by the one or more processors, each training image in the plurality of training images into a set intermediate training images, wherein each intermediate training image of the set of intermediate training images is associated with a different single-color channel;
   generating, by the one or more processors, a plurality of heat maps based on the defect distribution information, wherein each heat map of the plurality of heat maps indicates respective frequencies of a corresponding category of defect presented at corresponding locations in at least one of the plurality of training images;
   converting, by the one or more processors, each heat map of the plurality of heat maps into a set of intermediate heat maps, wherein each intermediate heat map of the set of intermediate heat maps is associated with a different single-color channel;
   combining, by the one or more processors, each intermediate training image of the set of intermediate training images with a corresponding single-color intermediate heat map of the set of intermediate heat maps to form a combined set of intermediate training images;

training, by the one or more processors, the defect classifier using the combined set of intermediate training images;

determining, by the one or more processors, a target category of the defect of the first object by applying the image to the trained defect classifier; and generating, by one or more processors, one or more correction notifications based on the determined target category of the defect of the first object.

2. The computer-implemented method of claim 1, the method further comprising:

obtaining, by the one or more processors, label information for the plurality of training images, the label information indicating one of the plurality of predetermined categories of a defect presented in each of the plurality of training images;

identifying, by the one or more processors, a plurality of regions of the plurality of training image where the defects are presented; and determining, by the one or more processors, the defect distribution information based on the label information and the plurality of regions.

3. The computer-implemented method of claim 1, the method further comprising:

generating, by the one or more processors, an integrated intermediate heat map for each intermediate heat map in the set of intermediate heat maps based, at least in part, on:

generating, by the one or more processors, a background image based on one or more of the plurality of training images;

adjusting, by the one or more processors, an intermediate heat map based on a factor indicating a contrast of the intermediate heat map against the background image; and generating, by the one or more processors, the integrated intermediate heat map by combining the background image with the adjusted intermediate heat map.

4. The computer-implemented method of claim 1, the method further comprising:

determining, by the one or more processors, the defect classifier based on the plurality of training images and the defect distribution information.

5. The computer-implemented method of claim 1, wherein the first object and at least one of the second objects are produced in a same process.

6. A computer system, the computer system comprising:
one or more computer processors;
one or more computer readable storage medium;
program instructions stored on the computer readable storage medium for execution by at least one of the one or more processors, the program instructions comprising instructions to:

obtain an image of a first object, the image presenting a defect of the first object; obtain defect distribution information indicating respective frequencies of a plurality of predetermined categories of defects presented at corresponding locations in a plurality of training images, wherein the plurality of training images are multi-color channel images presenting second objects used for training a defect classifier;

convert each training image in the plurality of training images into a set intermediate training images, wherein each intermediate training image of the set of intermediate training images is associated with a different single-color channel;

generate a plurality of heat maps based on the defect distribution information, wherein each heat map of the plurality of heat maps indicates respective frequencies of a corresponding category of defect presented at corresponding locations in at least one of the plurality of training images;

convert each heat map of the plurality of heat maps into a set of intermediate heat maps, wherein each intermediate heat map of the set of intermediate heat maps is associated with a different single-color channel;

combine each intermediate training image of the set of intermediate training images with a corresponding single-color intermediate heat map of the set of intermediate heat maps to form a combined set of intermediate training images;

train, by the one or more processors, the defect classifier using the combined set of intermediate training images;

determine a target category of the defect of the first object by applying the image to the trained defect classifier; and generate one or more correction notifications based on the determined target category of the defect of the first object.

7. The computer system of claim 6, the program instructions further comprising instructions to:

obtain label information for the plurality of training images, the label information indicating one of the plurality of predetermined categories of a defect presented in each of the plurality of training images;

identify a plurality of regions of the plurality of training image where the defects are presented; and determine the defect distribution information based on the label information and the plurality of regions.

8. The computer system of claim 6, the program instructions further comprising generating an integrated intermediate heat map for each intermediate heat map in the set of intermediate heat maps, based, at least in part, on instructions to:

generate a background image based on one or more of the plurality of training images;

adjust an intermediate heat map based on a factor indicating a contrast of the intermediate heat map against the background image; and generate the integrated intermediate heat map by combining the background image with the adjusted intermediate heat map.

9. The computer system of claim 6, the program instructions further comprising instructions to:

determine the defect classifier based on the plurality of training images and the defect distribution information.

10. The computer system of claim 6, wherein the first object and at least one of the second objects are produced in a same process.

11. A computer program product, the computer program product comprising one or more computer-readable storage media and program instructions stored on the one or more computer-readable storage media, the program instructions comprising instructions to:

obtain an image of a first object, the image presenting a defect of the first object; obtain defect distribution information indicating respective frequencies of a plurality of predetermined categories of defects presented at corresponding locations in a plurality of training images, wherein the plurality of training images are multi-color channel images presenting second objects used for training a defect classifier;

convert each training image in the plurality of training images into a set intermediate training images, wherein each intermediate training image of the set of intermediate training images is associated with a different single-color channel;

generate a plurality of heat maps based on the defect distribution information, wherein each heat map of the plurality of heat maps indicates respective frequencies of a corresponding category of defect presented at corresponding locations in at least one of the plurality of training images;

convert each heat map of the plurality of heat maps into a set of intermediate heat maps, wherein each intermediate heat map of the set of intermediate heat maps is associated with a different single-color channel;

combine each intermediate training image of the set of intermediate training images with a corresponding single-color intermediate heat map of the set of intermediate heat maps to form a combined set of intermediate training images;

train, by the one or more processors, the defect classifier using the combined set of intermediate training images;

determine a target category of the defect of the first object by applying the image to the trained defect classifier; and generate one or more correction notifications based on the determined target category of the defect of the first object.

12. The computer program product of claim 11, the program instructions further comprising instructions to:
obtain label information for the plurality of training images, the label information indicating one of the plurality of predetermined categories of a defect presented in each of the plurality of training images;
identify a plurality of regions of the plurality of training image where the defects are presented; and
determine the defect distribution information based on the label information and the plurality of regions.

13. The computer program product of claim 11, the program instructions further comprising generating an integrated intermediate heat map for each intermediate heat map in the set of intermediate heat maps based, at least in part, on instructions to:
program instructions to generate an intermediate map for the heat map by determining pixel values of the intermediate map based on the frequencies of the corresponding category of defects presented at the corresponding locations in the one or more training images;
generate a background image based on one or more of the plurality of training images;
adjust an intermediate heat map based on a factor indicating a contrast of the intermediate heat map against the background image; and
generate the integrated intermediate heat map by combining the background image with the adjusted intermediate heat map.

14. The computer program product of claim 11, the program instructions further comprising instructions to:
determine the defect classifier based on the plurality of training images and the defect distribution information.

\* \* \* \* \*